United States Patent
Gell et al.

(10) Patent No.: US 12,351,259 B2
(45) Date of Patent: Jul. 8, 2025

(54) CHASSIS OF A MOTOR VEHICLE

(71) Applicant: ZF Friedrichshafen AG, Friedrichshafen (DE)

(72) Inventors: Klaus Gell, Obernzell (DE); Johann Wimmer, Neuburg A. Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/757,984

(22) Filed: Jun. 28, 2024

(65) Prior Publication Data
US 2025/0002084 A1 Jan. 2, 2025

(30) Foreign Application Priority Data
Jun. 28, 2023 (DE) .......................... 102023206074.4

(51) Int. Cl.
*B62D 7/18* (2006.01)
*B60G 3/20* (2006.01)
(Continued)

(52) U.S. Cl.
CPC ................ *B62D 7/18* (2013.01); *B60G 3/20* (2013.01); *B60G 7/001* (2013.01); *B60G 7/02* (2013.01);
(Continued)

(58) Field of Classification Search
CPC ... B62D 7/18; B62D 7/08; B62D 7/20; B60G 3/20; B60G 7/001; B60G 7/02;
(Continued)

(56) References Cited

U.S. PATENT DOCUMENTS

RE21,348 E * 2/1940 Haltenberger ........... B62D 7/00
                                                   280/124.136
2,263,107 A * 11/1941 Smirl ..................... B60G 11/00
                                                   280/124.164
(Continued)

FOREIGN PATENT DOCUMENTS

DE        10225356 A1   12/2003
DE     102015211529 A1   12/2016
EP         1995087 A2   11/2008

OTHER PUBLICATIONS

German Search Report for Application No. 102023206074.4 dated Feb. 29, 2024.

*Primary Examiner* — Timothy Wilhelm
(74) *Attorney, Agent, or Firm* — Dority & Manning, P.A.

(57) ABSTRACT

A chassis of a utility motor vehicle has a double wishbone suspension having two independent wheel suspensions, each wheel suspensions has an upper control arm, a lower control arm, and a wheel carrier. The upper control arm is connected to two upper connection points on the vehicle body which define a first axis, the upper control arm being rotatable relative to the vehicle body about the first axis, and the lower control arm being connected to two lower connection points on the vehicle body which define a second axis, the lower control arm being rotatable with respect to the vehicle body about the second axis. The first and second axes are parallel to one another and inclined relative to a horizontal by an inclination angle that is greater than 0° in a forward direction of travel when the double wishbone suspension is installed in the utility motor vehicle.

12 Claims, 4 Drawing Sheets

(51) Int. Cl.
  *B60G 7/00* (2006.01)
  *B60G 7/02* (2006.01)
  *B62D 7/08* (2006.01)
  *B62D 7/20* (2006.01)

(52) U.S. Cl.
  CPC .............. *B62D 7/08* (2013.01); *B62D 7/20* (2013.01); *B60G 2200/156* (2013.01); *B60G 2204/143* (2013.01); *B60G 2204/148* (2013.01); *B60G 2204/418* (2013.01)

(58) Field of Classification Search
  CPC .............. B60G 7/08; B60G 2200/156; B60G 2204/143; B60G 2204/148; B60G 2204/418
  See application file for complete search history.

(56) References Cited

U.S. PATENT DOCUMENTS

| | | | | |
|---|---|---|---|---|
| 2,669,315 | A * | 2/1954 | Butterfield | B60G 9/00 267/67 |
| 3,189,118 | A * | 6/1965 | Arning | B60G 3/20 267/221 |
| 3,630,303 | A * | 12/1971 | Froumajou | B60G 15/062 280/124.136 |
| 3,881,741 | A * | 5/1975 | Muller | B60G 3/20 280/86.757 |
| 4,046,403 | A * | 9/1977 | Yoshida | B60G 3/02 280/124.145 |
| 4,511,160 | A * | 4/1985 | Inoue | B60G 15/07 280/124.148 |
| 4,650,211 | A * | 3/1987 | Tanahashi | B60G 3/20 280/124.135 |
| 4,664,412 | A * | 5/1987 | Matschinsky | B60G 3/26 280/771 |
| 4,671,532 | A * | 6/1987 | Matschinsky | B60G 99/00 280/124.135 |
| 4,681,342 | A * | 7/1987 | Goerich | B60G 3/26 280/124.15 |
| 4,840,396 | A * | 6/1989 | Kubo | B60G 3/202 280/124.151 |
| 4,842,296 | A * | 6/1989 | Kubo | B60G 3/26 280/124.136 |
| 4,930,804 | A * | 6/1990 | Tattermusch | B60G 3/20 280/124.138 |
| 4,941,677 | A * | 7/1990 | Matsumoto | B62D 17/00 280/124.138 |
| 4,957,308 | A * | 9/1990 | Takizawa | B60G 3/20 280/124.144 |
| 4,966,385 | A * | 10/1990 | Iwasaki | B60G 3/265 280/124.141 |
| 4,968,056 | A * | 11/1990 | Haraguchi | B60G 3/20 280/124.135 |
| 5,048,860 | A * | 9/1991 | Kanai | B60G 3/205 280/124.148 |
| 5,114,175 | A * | 5/1992 | Sakai | B60G 3/20 280/124.137 |
| 5,197,755 | A * | 3/1993 | Quick | B60G 11/16 280/124.141 |
| 5,348,334 | A * | 9/1994 | Giltinan | B60G 7/001 280/124.153 |
| 5,348,337 | A * | 9/1994 | Ando | B60G 15/062 280/124.135 |
| 5,380,035 | A * | 1/1995 | Lee | B60G 3/265 280/124.145 |
| 5,496,055 | A * | 3/1996 | Shibahata | B62D 7/18 280/124.141 |
| 5,507,510 | A * | 4/1996 | Kami | B60G 3/26 280/124.136 |
| 5,560,638 | A * | 10/1996 | Lee | B60G 3/202 280/124.148 |
| 5,560,651 | A * | 10/1996 | Kami | B60K 13/04 180/311 |
| 5,782,484 | A * | 7/1998 | Kuhn, Jr. | B60G 3/265 267/248 |
| 5,868,410 | A * | 2/1999 | Kawabe | B60G 3/265 280/124.134 |
| 5,921,578 | A * | 7/1999 | Sekita | B60K 1/04 296/203.02 |
| 5,938,219 | A * | 8/1999 | Hayami | B60G 3/20 280/124.135 |
| 5,975,541 | A * | 11/1999 | Harara | B60G 7/006 280/124.135 |
| 5,992,868 | A * | 11/1999 | Orimoto | B60G 3/26 280/124.138 |
| 6,000,706 | A * | 12/1999 | Boberg | B60G 3/20 280/124.135 |
| 6,099,005 | A * | 8/2000 | Wakatsuki | B60G 7/02 280/124.135 |
| 6,123,351 | A * | 9/2000 | Bruehl | B60G 3/20 280/124.135 |
| 6,296,264 | B1 * | 10/2001 | Wimmer | B60G 11/27 280/124.135 |
| 6,302,420 | B1 * | 10/2001 | Sano | B60G 3/26 280/124.135 |
| 6,305,700 | B1 * | 10/2001 | Bruehl | B60G 3/26 280/124.135 |
| 6,338,495 | B1 * | 1/2002 | Lee | B60G 7/003 280/124.148 |
| 6,378,881 | B2 * | 4/2002 | Stenvall | B60G 3/06 280/124.171 |
| 6,390,486 | B1 * | 5/2002 | Boes | B60G 11/08 280/124.171 |
| 6,431,569 | B2 * | 8/2002 | Handa | B60G 3/20 280/124.138 |
| 6,457,729 | B2 * | 10/2002 | Stenvall | B60G 11/08 280/124.171 |
| 6,550,796 | B2 * | 4/2003 | Behr | B60G 15/06 280/124.179 |
| 6,695,329 | B2 * | 2/2004 | Handa | B60G 3/18 280/124.152 |
| 6,719,314 | B1 * | 4/2004 | Schote | B60G 7/001 280/124.135 |
| 6,752,409 | B1 * | 6/2004 | Kunert | B60G 3/26 280/124.135 |
| 6,764,084 | B1 * | 7/2004 | Nakamura | B60G 7/02 280/124.135 |
| 6,783,137 | B2 * | 8/2004 | Nagreski | F16C 19/54 280/124.135 |
| 6,938,908 | B2 * | 9/2005 | Oda | B60G 3/26 280/124.109 |
| 7,048,286 | B2 * | 5/2006 | Eppelein | B60G 3/26 280/124.106 |
| 7,083,016 | B2 * | 8/2006 | Chernoff | B60L 50/16 454/69 |
| 7,258,355 | B2 * | 8/2007 | Amano | B60G 3/20 280/124.135 |
| 7,377,295 | B2 * | 5/2008 | Byers | B60G 7/00 446/471 |
| 7,506,882 | B2 * | 3/2009 | Gerrard | B60G 7/001 280/124.145 |
| 7,537,071 | B2 * | 5/2009 | Kamiya | B60K 17/043 180/57 |
| 7,607,671 | B2 * | 10/2009 | McConville | B60G 3/20 280/124.135 |
| 7,661,688 | B2 * | 2/2010 | Koumura | B60G 7/008 280/124.135 |
| 7,694,983 | B2 * | 4/2010 | Griffiths | B60G 3/20 280/124.135 |
| 7,766,344 | B2 * | 8/2010 | Buma | B60G 3/202 280/124.152 |
| 7,784,807 | B2 * | 8/2010 | Brandl | B60G 7/008 280/124.135 |
| 7,798,507 | B2 * | 9/2010 | Hirai | B60G 3/20 280/124.135 |
| 7,891,684 | B1 * | 2/2011 | Luttinen | B60G 3/20 280/124.136 |
| 7,963,538 | B2 * | 6/2011 | Roland | B60G 7/008 280/124.138 |

(56) References Cited

U.S. PATENT DOCUMENTS

| | | | | |
|---|---|---|---|---|
| 8,052,160 B2 * | 11/2011 | Hirai | B60G 3/265 | 280/124.135 |
| 8,322,729 B2 * | 12/2012 | Michel | B60G 7/008 | 280/5.52 |
| 8,444,160 B2 * | 5/2013 | Okamoto | B60G 3/20 | 280/124.135 |
| 8,583,328 B2 * | 11/2013 | Mori | B62D 17/00 | 280/5.522 |
| 8,678,409 B2 * | 3/2014 | Koide | B60G 7/008 | 280/124.135 |
| 8,708,359 B2 * | 4/2014 | Murray | B60G 7/001 | 280/124.148 |
| 8,746,719 B2 * | 6/2014 | Safranski | B60G 7/008 | 280/124.152 |
| 8,899,364 B1 * | 12/2014 | Al Qanaei | B62D 21/183 | 180/89.1 |
| 8,998,216 B2 * | 4/2015 | Maeda | B62D 21/183 | 280/5.511 |
| 9,096,273 B2 * | 8/2015 | Mohrlock | B60G 7/02 | |
| 9,238,395 B2 * | 1/2016 | Roland | B60G 21/007 | |
| 9,254,725 B2 * | 2/2016 | Okuyama | B60G 3/20 | |
| 9,469,173 B2 * | 10/2016 | Murray | B60G 3/202 | |
| 9,545,827 B2 * | 1/2017 | Goldberg | B60G 7/02 | |
| 9,669,869 B2 * | 6/2017 | Kageyama | B62D 5/00 | |
| 9,694,676 B2 * | 7/2017 | Bandy | B60G 3/202 | |
| 9,844,991 B2 * | 12/2017 | Dusini | B62D 17/00 | |
| 9,987,896 B2 * | 6/2018 | Schmidt | B60G 7/001 | |
| 10,226,977 B2 * | 3/2019 | Coppuck | B60G 3/202 | |
| 10,350,955 B2 * | 7/2019 | Langhoff | B60G 3/20 | |
| 10,399,401 B2 * | 9/2019 | Schlangen | B60G 3/20 | |
| 10,744,833 B2 | 8/2020 | Gell et al. | | |
| 10,807,426 B2 * | 10/2020 | Girelli Consolaro | B60G 3/20 | |
| 10,807,430 B2 * | 10/2020 | Babu | F16F 1/3842 | |
| 11,014,419 B2 * | 5/2021 | Danielson | B60N 3/04 | |
| 11,014,420 B2 * | 5/2021 | Sawai | B60G 7/001 | |
| 11,072,216 B2 * | 7/2021 | Yang | B60G 7/005 | |
| 11,279,217 B2 * | 3/2022 | Kraft | B60G 11/181 | |
| 11,376,910 B1 * | 7/2022 | Yamamoto | B62D 21/11 | |
| 11,691,471 B2 * | 7/2023 | Okuyama | B60G 7/001 | 280/124.156 |
| 11,820,194 B2 * | 11/2023 | Okuyama | B60G 7/005 | |
| 11,912,097 B2 * | 2/2024 | Dong | B60G 3/202 | |
| 11,952,055 B1 * | 4/2024 | Oh | F16D 65/14 | |
| 2001/0048207 A1 * | 12/2001 | Handa | B60G 15/062 | 280/124.135 |
| 2005/0046136 A1 * | 3/2005 | Sutton | B60G 3/20 | 280/124.135 |
| 2007/0228684 A1 * | 10/2007 | Bowers | B60G 3/20 | 280/124.134 |
| 2008/0067773 A1 * | 3/2008 | Chalin | B60G 7/001 | 280/124.135 |
| 2008/0179116 A1 * | 7/2008 | Ikenoya | B60K 17/356 | 180/63 |
| 2009/0008887 A1 * | 1/2009 | Buma | B60G 17/0164 | 280/5.511 |
| 2010/0276904 A1 * | 11/2010 | Pavuk | B60G 3/202 | 280/124.135 |
| 2012/0043736 A1 * | 2/2012 | Okamoto | B60G 3/20 | 280/124.135 |
| 2014/0225357 A1 * | 8/2014 | Shinbori | B60R 21/13 | 280/771 |
| 2016/0159180 A1 * | 6/2016 | Palatov | B60G 13/003 | 280/5.507 |
| 2019/0193501 A1 * | 6/2019 | Brady | B60G 3/202 | |
| 2019/0291521 A1 * | 9/2019 | Sawai | B60G 3/202 | |
| 2019/0367086 A1 * | 12/2019 | De Grammont | B62D 7/18 | |
| 2021/0402875 A1 * | 12/2021 | Pham | B62D 7/14 | |

* cited by examiner

CHASSIS OF A MOTOR VEHICLE

CROSS-REFERENCE TO RELATED APPLICATION

The present application is related and has right of priority to German Patent Application No. 10 2023 206 074.4 filed on Jun. 28, 2023, the entirety of which is incorporated by reference for all purposes.

FIELD OF THE INVENTION

The invention relates generally to a chassis of a motor vehicle, in particular of a utility vehicle having at least one double wishbone suspension, each double wishbone suspension having two independent wheel suspensions, wherein each of the two independent wheel suspensions of each of the at least one double wishbone suspension has an upper control arm and a lower control arm, which, in the independent wheel suspension, each establish a connection between a wheel carrier of the independent wheel suspension and a vehicle body of the motor vehicle, wherein the individual control arm is connected, on the vehicle body side, to two connection points, each of the two connection point defining an axis of rotation of the individual control arm with respect to the vehicle body. The invention also relates generally to a utility vehicle having an aforementioned chassis.

BACKGROUND

In chassis of motor vehicles, independent wheel suspensions are known in which the individual vehicle wheel of a vehicle axle is rotatably mounted on an associated wheel carrier and the associated wheel carrier is then also connected, as a coupling member of a kinematic chain, to a vehicle body in particular via one or more suspension links. A common embodiment of an independent wheel suspension is a double-wishbone independent wheel suspension, in which the wheel carrier is connected to the vehicle body via two control arms, one control arm being arranged above a wheel center of the vehicle wheel to be guided on the wheel carrier, and one control arm being arranged below the wheel center of the vehicle wheel to be guided on the wheel carrier. In addition, a toe link is usually also provided in order to define a toe of the vehicle wheel.

DE 10 2015 211 529 A1 describes a double-wishbone independent wheel suspension, in which a wheel carrier in the form of a steering knuckle is connected to a vehicle body by an upper control arm and by a lower control arm. The control arms are configured as a wishbone, in that the individual control arm is connected, on the vehicle body side, to two connection points via pivot bearings in the form of rubber bearings, while, on the steering knuckle side, the individual control arm is connected to a kingpin of the steering knuckle via a ball joint. The two vehicle-body-side connection points of the individual control arm lie on one axis of rotation, about which the individual control arm is pivotable with respect to the vehicle body via the rubber bearings.

SUMMARY OF THE INVENTION

Proceeding from the above-described prior art, the problem addressed by the present invention is that of providing a chassis, via which an increase in driving comfort in a motor vehicle is achieved.

According to the invention, a chassis of a motor vehicle has at least one double wishbone suspension, which includes two independent wheel suspensions. The independent wheel suspensions of the at least one double wishbone suspension each have an upper control arm and a lower control arm, each of the upper and lower control arms, in the associated independent wheel suspension, establishes a connection between a wheel carrier of the independent wheel suspension and a vehicle body of the motor vehicle. The individual control arm is connected, on the vehicle body side, to two connection points, each connection point defining an associated axis of rotation of the individual control arm with respect to the vehicle body.

The chassis according to the invention therefore has at least one double wishbone suspension, which is composed of two independent wheel suspensions. The independent wheel suspensions are each configured as double-wishbone independent wheel suspensions to form the at least one double wishbone suspension. In the individual independent wheel suspension, an upper control arm and a lower control arm are provided. The upper control arm lies, in particular, above a wheel center defined by the wheel carrier of the independent wheel suspension and the lower control arm is preferably arranged below this wheel center. Each of the control arms connects the wheel carrier of the independent wheel suspension to a vehicle body of a motor vehicle having the chassis. Due to the double-wishbone independent wheel suspension, transversal loads as well as longitudinal forces are absorbed in the independent wheel suspension due to the, therefore, double connection of the wheel carrier via the control arms.

The individual control arm of the independent wheel suspension is coupled to the vehicle body of the motor vehicle via two connection points, both connection points lying on one axis of rotation, about which the individual control arm executes pivoting motions with respect to the vehicle body of the motor vehicle when the wheel carrier is guided.

The invention now encompasses the technical teaching that, when the at least one double wishbone suspension is installed in the motor vehicle, the axes of rotation of the control arms associated with the independent wheel suspension are parallel to one another and are both inclined relative to a horizontal about an inclination angle that is greater than 0° in a forward direction of travel of the motor vehicle. In other words, the axes of rotation of the control arms in the individual independent wheel suspension extend parallel to one another when the at least one double wishbone suspension is installed, i.e., when the at least one double wishbone suspension is installed in the motor vehicle. In this parallel extension, the axes of rotation of the control arms of the individual independent wheel suspension are tilted relative to a horizontal, this being implemented with an inclination angle that is greater than 0° and resulting in an inclination of the individual axis of rotation in a forward direction of travel of the motor vehicle.

Due to the inclination of the axes of rotation of the double wishbones about the inclination angle in the forward direction of travel, the double wishbone suspension formed by the double-wishbone independent wheel suspensions is therefore installed having been rotated overall through the inclination angle, as a result of which brake dive or pitching forces are advantageously better supported in the double wishbone suspension. This results in increased driving comfort during braking operations of the motor vehicle.

As set forth in the invention, an inclination of the individual axes of rotation with a positive inclination angle in the forward direction of travel of the motor vehicle means that the individual axis of rotation is tilted forward with respect to the motor vehicle, i.e., a point of intersection of the individual axis of rotation with the road lies on a side of a wheel contact point situated in the forward direction of travel of the motor vehicle, on which wheel contact point a vehicle wheel guided via the individual wheel suspension would be in contact with the road. Since all the axes of rotation of the independent wheel suspensions of the double wishbone suspension installed according to the invention are inclined at the inclination angle greater than 0°, points of intersection of the axes of rotation with the road therefore all lie on sides of wheel contact points situated in the forward direction of travel of the motor vehicle.

According to one embodiment of the invention, the inclination angle is at least 1°, and the inclination angle is preferably in a range of 1° to 15° and, particularly preferably, in a range of 1° to 4°. This range has already proven particularly advantageous with regard to supporting brake dive forces and any other driving behavior that is achieved via the at least one double wishbone suspension.

In one development of the invention, the control arms of the independent wheel suspension are each connected at the vehicle-body-side connection points via pivot bearings, in particular rubber bearings. Advantageously, the pivoting motions of the individual control arm relative to the vehicle body are configured in a reliable manner. An embodiment of the pivot bearing as a rubber bearing allows for a relatively rigid design of the pivot bearing, as a result of which transversal and longitudinal forces are absorbed by the individual pivot bearing.

According to one advantageous design option of the invention, the control arms of the independent wheel suspension are each connected to the wheel carrier of the independent wheel suspension at one connection point. The individual control arm is therefore a wishbone. In a development of this design option, the wheel-carrier-side connection points of the control arms in the independent wheel suspension each define a steering axis, which is inclined relative to a vertical by a caster angle counter to the forward direction of travel of the motor vehicle when the at least one double wishbone suspension is installed. As a result, positive caster is achieved in the individual independent wheel suspension and thus also on both sides of the double wishbone suspension, as a result of which the tracking stability is improved and, when a steerable axle is present, steering return is achieved. Preferably, the caster angle is greater than 0° and, in particular, greater than or equal to 1°.

In another embodiment of the invention, the at least one double wishbone suspension is in the form of a steerable axle and a tie rod acts on the wheel carrier of the independent wheel suspension, via which tie rod steering motions are introduced into the wheel carrier. The wheel carrier could also be referred to as a steering knuckle.

In one development of the aforementioned embodiment, the independent wheel suspension of the at least one double wishbone suspension has a steering-knuckle carrier, the steering-knuckle carrier being connected at the wheel-carrier-side connection points of the control arms of the independent wheel suspension via pivot bearings and coupled to a steering-knuckle stub via a pivot bearing in each case. Each steering-knuckle stub in the independent wheel suspension carries a kingpin, on which the wheel carrier of the independent wheel suspension is rotatably guided. Advantageously, a robust configuration of a steerable double wishbone suspension is achieved as a result, which is suitable in particular for an application with a heavy-duty utility vehicle.

The invention also relates to a utility vehicle which has a chassis according to one or more of the above-described variants. The utility vehicle is, particularly preferably, a truck and, in particular, a heavy-duty truck.

In a development of an aforementioned utility vehicle, a steerable front axle in the chassis is then preferably a steerable variant of the double wishbone suspension according to the invention.

BRIEF DESCRIPTION OF THE DRAWINGS

One advantageous embodiment of the invention, which is explained in the following, is shown in the drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
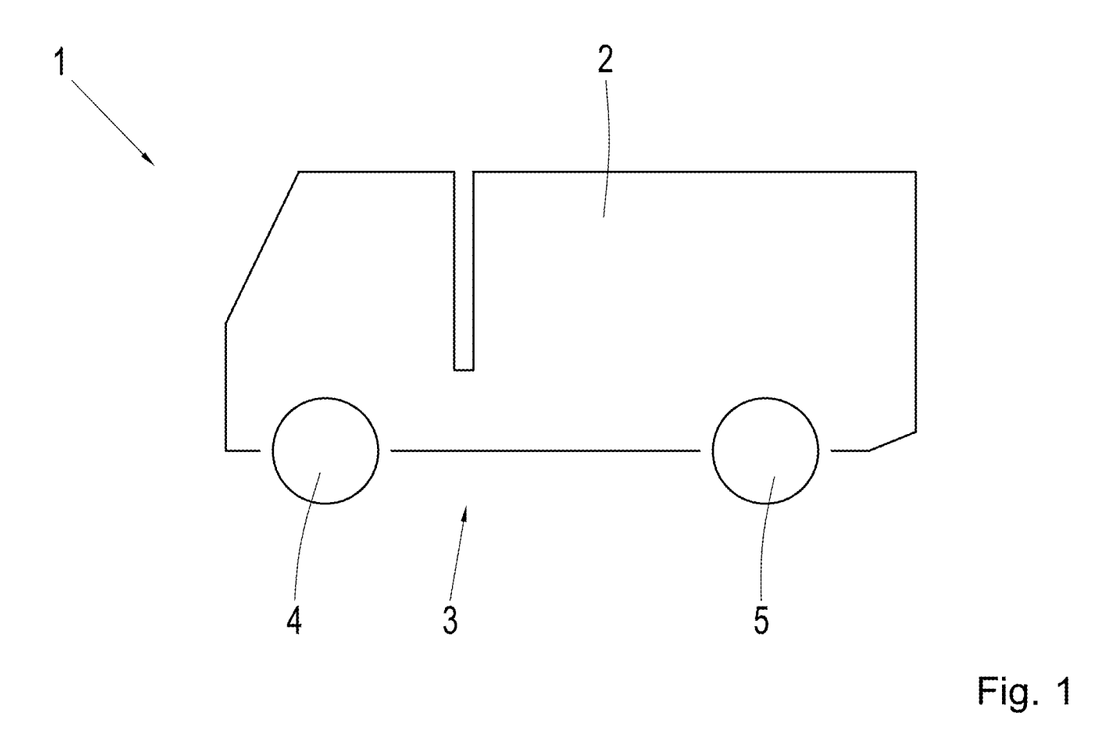
FIG. 1 shows a schematic view of a utility vehicle with a chassis according to the invention.

FIG. 1 shows a schematic view of a utility vehicle 1, which is a truck and, particularly preferably, a heavy-duty truck. In addition to a vehicle body 2, the utility vehicle 1 has a chassis 3, which is formed by a steerable front axle 4 and at least one rear axle 5 and is designed according to one embodiment of the invention.

Figure 2:
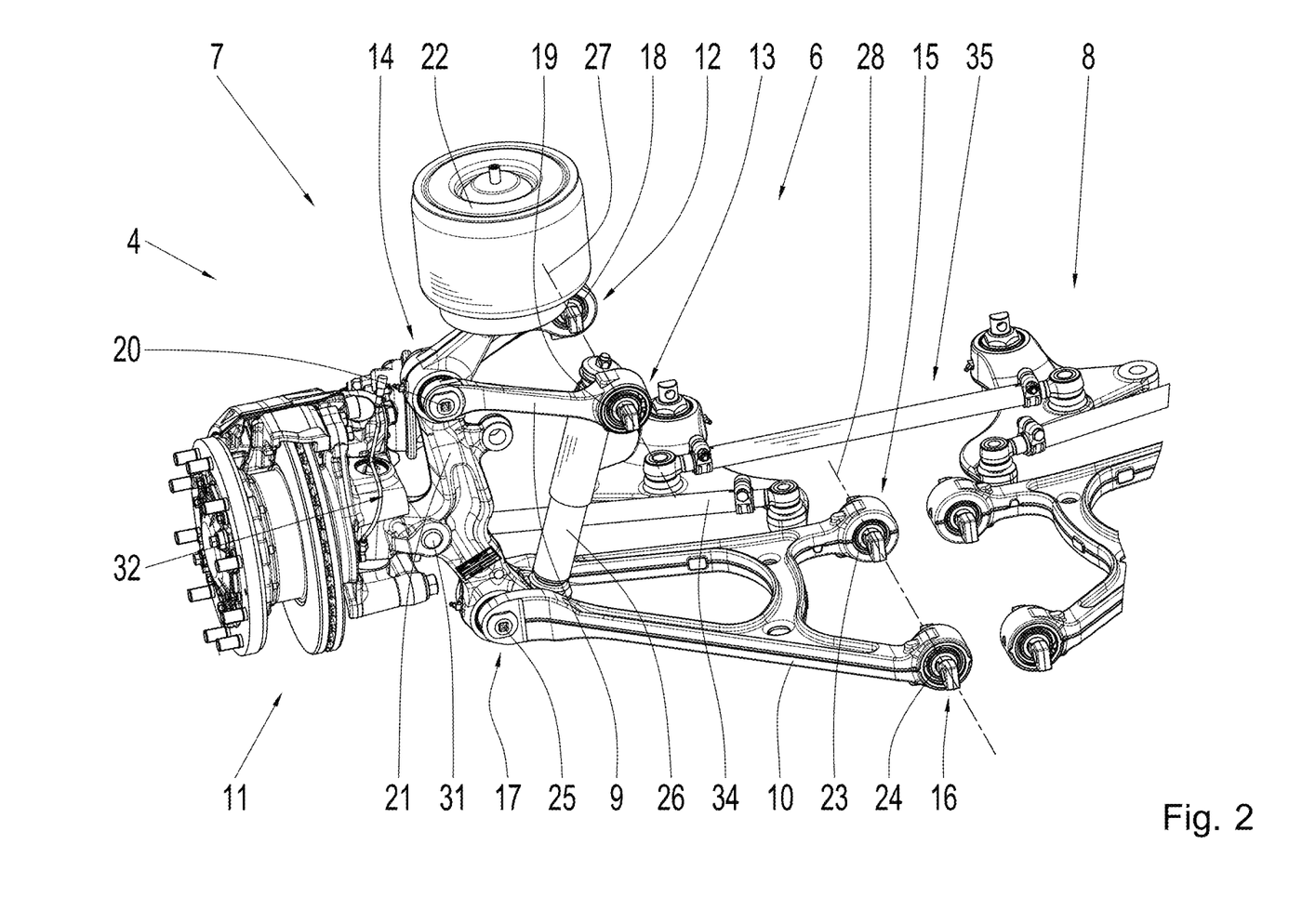
FIGS. 2 through 4 show different views of a front axle of the chassis shown in FIG. 1, which front axle is configured as a double wishbone suspension.
Figure 3:
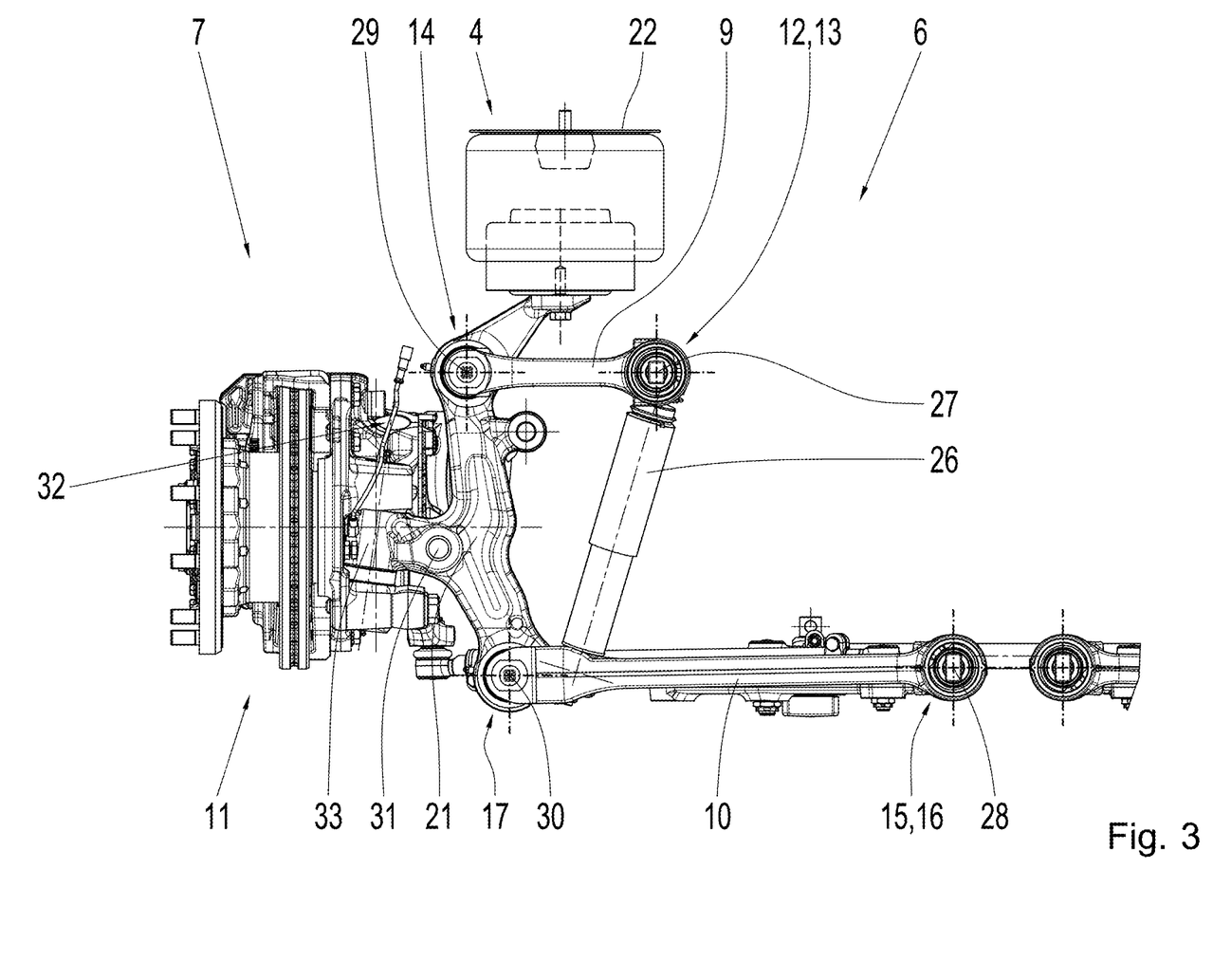
Figure 4:
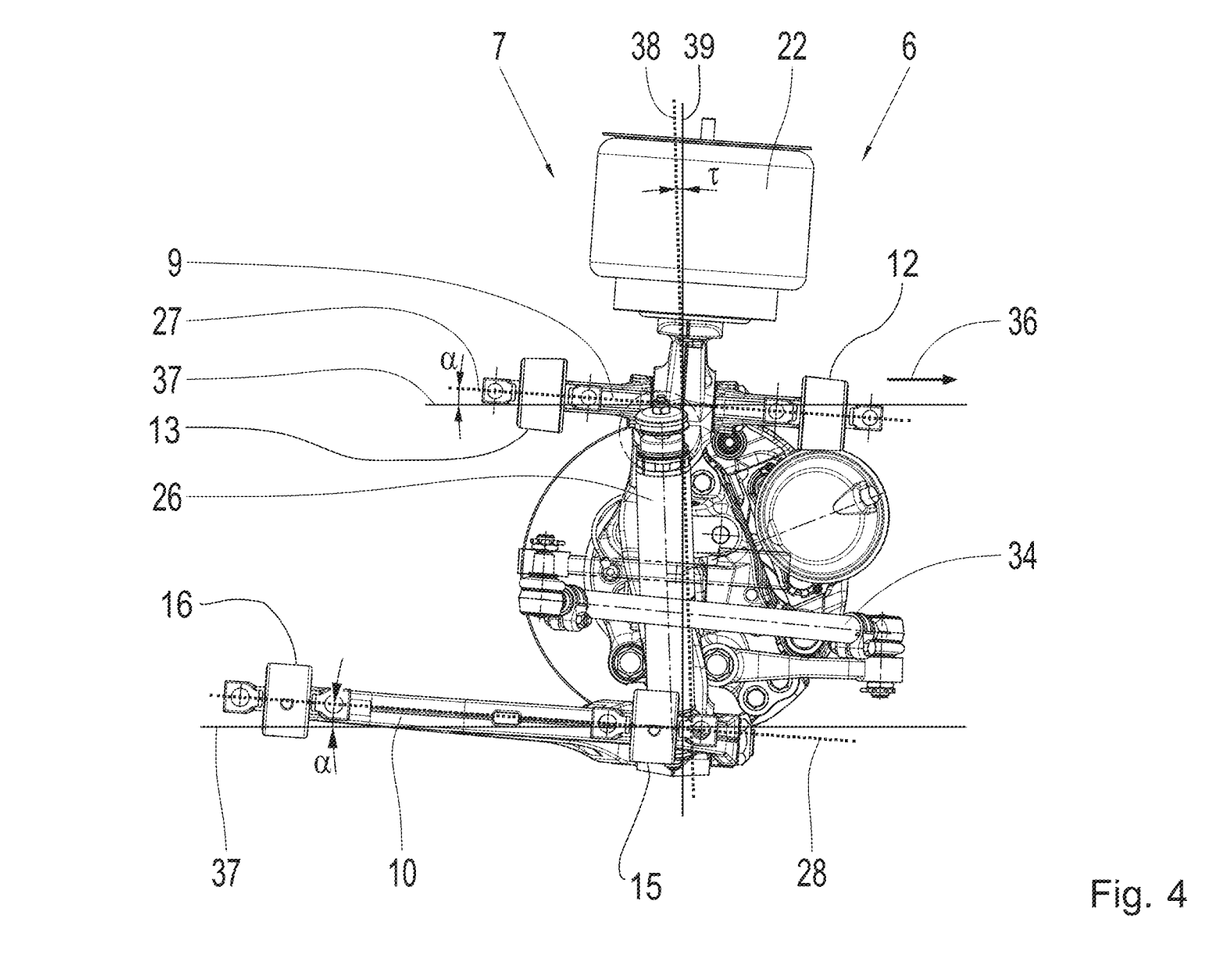

The front axle 4 of the chassis 3 is shown in part in each of different views in FIGS. 2 through 4. The front axle 4 is configured as a double wishbone suspension 6, which is composed of two independent wheel suspensions 7 and 8, of which only the independent wheel suspension 7 is shown in detail in FIGS. 2 through 4. In the manner known in principle by a person skilled in the art, the independent wheel suspension 8, in a mirror-image configuration in the double wishbone suspension 6, corresponds to the configuration of the independent wheel suspension 7, and therefore the following description of the independent wheel suspension 7 also applies to the independent wheel suspension 8.

The independent wheel suspension 7 of the double wishbone suspension 6 includes an upper control arm 9 and a lower control arm 10, each of which establishes a connection of the vehicle body 2 (not shown in FIGS. 2 through 4) to a wheel carrier 11 of the independent wheel suspension 7. The control arms 9, 10 are each configured as a wishbone and therefore each have three connection points, respectively. For instance, the upper control arm 9 has connection points 12, 13, 14, and the lower control arm has connection points 15, 16, 17. In the case of the upper control arm 9, a connection to the vehicle body 2 is established at each of the connection points 12, 13 within the chassis 3, via a pivot bearing 18, 19, respectively, each of the pivot bearings 18, 19 being in the form of a rubber bearing, while the upper control arm 9 is coupled to a steering-knuckle carrier 21 at the connection point 14 via a pivot bearing 20. In addition, an air spring 22 of the independent wheel suspension 7 is also connected in the region of the coupling of the upper control arm 9 to the steering-knuckle carrier 21.

The lower control arm 10 is also coupled to the vehicle body 2, wherein this is implemented at the connection points 15, 16 via pivot bearings 23, 24 provided here, which pivot bearings 23, 24 are also in the form of rubber bearings. At the connection point 17 of the lower control arm 10, the steering-knuckle carrier 21 is connected via a pivot bearing 25. In the region of this connection, a coupling to a damper 26 of the independent wheel suspension 7 is also established.

The connection points 12, 13 of the upper control arm 9 lie on an axis of rotation 27, about which the upper control arm 9 is rotatable relative to the vehicle body 2 via the pivot bearings 18, 19. Similarly, the connection points 15, 16 of the lower control arm 10 also lie on an axis of rotation 28, about which the lower control arm 10 is movable relative to the vehicle body 2 via the pivot bearings 23, 24. The steering-knuckle carrier 21 is rotatable relative to the upper control arm 9 and the lower control arm 10 about axes of rotation 29, 30 (FIG. 3), respectively. The axis of rotation 27 is parallel to the axis of rotation 28 and, in addition, to the axes of rotation 29, 30 are both parallel thereto.

The steering-knuckle carrier 21 is coupled at a further pivot bearing 31 to a steering-knuckle stub 32, which is tiltable relative to the steering-knuckle carrier 21 via the pivot bearing 31 and carries a kingpin 33. The wheel carrier 11 of the independent wheel suspension 7 is then rotatably guided on the kingpin 33. In addition, a tie rod 34 engages on the wheel carrier 11 eccentrically with respect to the guidance via the kingpin 33, which tie rod 34 is part of a steering system 35 and via which the steering motions are introduced into the wheel carrier 11.

FIG. 4 shows the independent wheel suspension 7 of the double wishbone suspension 6 installed in the utility vehicle 1. As a distinguishing feature, the double wishbone suspension 6 in the chassis 3 is now tilted so as to be inclined in a forward direction of travel 36. This is achieved due to the fact that the axes of rotation 27, 28 of the control arms 9, 10, respectively, of both independent wheel suspensions 7, 8 are both inclined relative to a horizontal 37 by an inclination angle α, i.e., both are tilted downward on a side facing the forward direction of travel 36. The inclination angle α is greater than 0° and is at least 1°. As a result, brake dive forces are better supported in the double wishbone suspension 6.

As is also apparent in FIG. 4, a steering axis 38 of the independent wheel suspension 7 extends at a caster angle τ to a vertical 39, as a result of which a positive caster in the double wishbone suspension 6 is achieved. The caster angle is greater than 0° and is preferably at least 1°.

By the embodiment of a chassis according to the invention, support of brake dive forces in a utility vehicle are improved.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 utility vehicle
2 vehicle body
3 chassis
4 front axle
5 rear axle
6 double-wishbone suspension
7 independent wheel suspension
8 independent wheel suspension
9 top control arm
10 lower control arm
11 wheel carrier
12 connection point
13 connection point
14 connection point
15 connection point
16 connection point
17 connection point
18 rotary bearing
19 rotary bearing
20 rotary bearing
21 steering-knuckle carrier
22 air spring
23 rotary bearing
24 rotary bearing
25 rotary bearing
26 damper
27 axis of rotation
28 axis of rotation
29 axis of rotation
30 axis of rotation
31 rotary bearing
32 steering-knuckle stub
33 kingpin
34 tie rod
35 steering system
36 forward direction of travel
37 horizontal
38 steering axis
39 vertical
α inclination angle
τ caster angle

The invention claimed is:

1. A chassis (3) of a utility motor vehicle (1), comprising:
at least one double wishbone suspension (6), each of the at least one double wishbone suspension (6) having two independent wheel suspensions (7, 8), each of the two independent wheel suspensions (7, 8) comprising:
an upper control arm (9), a lower control arm (10), and a wheel carrier (11), with the upper control arm (9) and the lower control arm (10) establishing a connection between the wheel carrier (11) and a vehicle body (2) of the utility motor vehicle (1), the upper control arm (9) being connected to two upper vehicle-body-side connection points (12, 13) on the vehicle body (2), the two upper vehicle-body-side connection points (12, 13) defining a first axis of rotation (27), the upper control arm (9) being rotatable with respect to the vehicle body (2) about the first axis of rotation (27), the lower control arm (10) being connected to two lower vehicle-body-side connection points (15, 16) on the vehicle body (2), the two lower vehicle-body-side connection points (15, 16) defining a second axis of rotation (28), the lower control arm (10) being rotatable with respect to the vehicle body (2) about the second axis of rotation (28), the first and second axes of rotation (27, 28) being parallel to one another and inclined downward relative to a horizontal (37) by an inclination angle (a) that is greater than 0° in a forward direction of travel (36) of the utility motor vehicle (1) when the at least one double wishbone suspension (6) is installed in the utility motor vehicle (1).

2. The chassis (3) of claim 1, wherein the inclination angle (a) is at least 1°.

3. The chassis (3) of claim 1, wherein the upper control arm (9) is connected at the upper vehicle-body-side connection points (12, 13) and the lower control arm (10) is connected at the lower vehicle-body-side connection points (15, 16) via rotary bearings (18, 19, 23, 24).

4. The chassis (3) of claim 3, wherein the rotary bearings (18, 19, 23, 24) are rubber bearings.

5. The chassis (3) of claim 1, wherein, for a respective one of the two independent wheel suspensions (7, 8), the upper control arm (9) is connected to the wheel carrier (11) at one first wheel-carrier-side connection point (14) and the lower control arm (10) is connected to the wheel carrier (11) at one second wheel-carrier-side connection point (17).

6. The chassis (3) of claim 5, wherein the first and second wheel-carrier-side connection points (14, 17) define a steering axis (38), the steering axis (38) being inclined relative to a vertical (39) by a caster angle (T) counter to the forward direction of travel (36) of the utility motor vehicle (1) when the at least one double wishbone suspension (6) is installed.

7. The chassis (3) of claim 6, wherein the caster angle (T) is greater than or equal to 1°.

8. The chassis (3) of claim 5, wherein each of the two independent wheel suspensions (7, 8) further has a steering-knuckle carrier (21), a steering-knuckle stub (32), and a kingpin (33), with the steering-knuckle carrier (21) being connected at the first and second wheel-carrier-side connection points (14, 17) via pivot bearings (20, 25) and coupled to the steering-knuckle stub (32) via a pivot bearing (31), with the steering-knuckle stub (32) carrying the kingpin (33), and with the wheel carrier (11) being rotatably guided on the kingpin (33).

9. The chassis (3) of claim 1, wherein the at least one double wishbone suspension (6) is a steerable axle, each of the two independent wheel suspensions (7, 8) further having a tie rod (34) configured to introduce steering motions into the wheel carrier (11).

10. A utility vehicle (1), comprising the chassis (3) of claim 1.

11. The utility vehicle (1) of claim 10, wherein one of the at least one double wishbone suspension (6) of the chassis (3) is a steerable front axle (4) of the utility vehicle (1).

12. The chassis (3) of claim 1, wherein the two upper vehicle-body-side connection points (12, 13) include a forward upper vehicle-body-side connection point (12) and a rearward upper vehicle-body-side connection point (13), the forward upper vehicle-body-side connection point (12) being forward of the rearward upper vehicle-body-side connection point (13) along the forward direction of travel (36), the forward upper vehicle-body-side connection point (12) being lower than the rearward upper vehicle-body-side connection point (13), and wherein the two lower vehicle-body-side connection points (15, 16) include a forward lower vehicle-body-side connection point (15) and a rearward lower vehicle-body-side connection point (16), the forward lower vehicle-body-side connection point (15) being forward of the rearward lower vehicle-body-side connection point (16) along the forward direction of travel (36), the forward lower vehicle-body-side connection point (15) being lower than the rearward lower vehicle-body-side connection point (16).

* * * * *